(12) United States Patent
Abbey

(10) Patent No.: US 7,273,374 B1
(45) Date of Patent: Sep. 25, 2007

(54) FOREIGN LANGUAGE LEARNING TOOL AND METHOD FOR CREATING THE SAME

(76) Inventor: Chad Abbey, 7959 Thompson Rd., Cicero, NY (US) 13039

( * ) Notice: Subject to any disclaimer, the term of this patent is extended or adjusted under 35 U.S.C. 154(b) by 101 days.

(21) Appl. No.: 10/931,024

(22) Filed: Aug. 31, 2004

(51) Int. Cl.
G09B 19/08 (2006.01)

(52) U.S. Cl. ..................................... 434/157

(58) Field of Classification Search ............... 434/156, 434/157, 167, 172, 178
See application file for complete search history.

(56) References Cited

U.S. PATENT DOCUMENTS

| | | | | |
|---|---|---|---|---|
| 3,190,013 | A * | 6/1965 | Cuttat | 434/365 |
| 3,271,884 | A * | 9/1966 | Robertson | 434/157 |
| 3,724,102 | A * | 4/1973 | Van Patten | 434/157 |
| 4,311,465 | A * | 1/1982 | Jacobs | 434/157 |
| 4,478,582 | A * | 10/1984 | Tucker | 434/170 |
| 4,731,021 | A | 3/1988 | Chan | |
| 5,055,049 | A | 10/1991 | Kasravi | |
| 5,525,060 | A * | 6/1996 | Loebner | 434/171 |
| 5,713,739 | A * | 2/1998 | Yu | 434/157 |
| 5,788,502 | A * | 8/1998 | Shea | 434/157 |
| 5,934,708 | A * | 8/1999 | Batjuk | 283/46 |
| 6,024,571 | A * | 2/2000 | Renegar | 434/157 |
| 6,325,630 | B1 * | 12/2001 | Grabmayr | 434/157 |
| 6,341,958 | B1 | 1/2002 | Zilberman | |
| 6,729,882 | B2 | 5/2004 | Noble | |
| 6,736,641 | B2 * | 5/2004 | Quiroz | 434/157 |

OTHER PUBLICATIONS

Joanna Crump, "English Irregular Plural Nouns", Jan. 27, 1997 [retrieved online Apr. 20, 2006].*
Carmen L. Torres-Robles, "Spanish Verbs and Essential Grammar Review", Jan. 2003, [retrieved online Apr. 20, 2006].*

* cited by examiner

Primary Examiner—Kurt Fernstrom
(74) Attorney, Agent, or Firm—Schweitzer Cornman Gross & Bondell LLP

(57) ABSTRACT

A learning tool and method of creating the same wherein words are arranged according to similarities or commonalities such that a user may more efficiently acquire knowledge of a foreign language based on an association method of learning. The learning tool is comprised of a plurality of words of a first known language and a second foreign language, wherein each word of the first language has a corresponding translation in the second language. The words of each language are compared and categorized into at least first and second groups A and B, wherein group A words possess one or more identifiable similar characteristics based on predetermined criteria. Group B, on the other hand, is comprised of words having dissimilar characteristics. Groups A and B are divided into subgroups according to parts of speech and gender characteristics, as identified, such that as groups A and B are further divided, each subgroup includes L1 words and L2 translations sharing more similar characteristics than the preceding group. The learning tool permits users to learn a foreign language by associating like words with one another.

12 Claims, 7 Drawing Sheets

FIG. 4

MASTER A - EN NOUNS - OR ENDINGS — 50c

| English (L1) | Swedish (L2) | "a" noun | "the" noun | 70 "plural" | "the" plural |
|---|---|---|---|---|---|
| A arena | arena | en arena | arenan | arenor | arenorna |
| B bubble | bubbla | en bubbla | bubblan | bubblor | bubblorna |
| C curve | kurva | en kurva | kurvan | kurvor | kurvorna |
| D dove | duva | en duva | duvan | duvor | duvorna |
| E era | era | en era | eran | eror | erorna |
| F flag | flagga | en flagga | flaggan | flaggor | flaggorna |
| G gorilla | gorilla | en gorilla | gorillan | gorillor | gorillorna |
| H harp | harpa | en harpa | harpan | harpor | harporna |
| J jacket | jacka | en jacka | jackan | jackor | jackorna |
| K koala | koala | en koala | koalan | koalor | koalor |
| L list | lista | en lista | listan | listor | listorna |
| M mule | mula | en mula | mulan | mulor | mulorna |

FIG. 5

MASTER A - EN NOUNS - ER ENDINGS

| English (L1) | Swedish (L2) | "a" noun | "the" noun | "plural" | "the" plural |
|---|---|---|---|---|---|
| A academy | akademi | en akademi | akademin | akademier | akademierna |
| B barricade | barrikad | en barrikad | barrikaden | barrikader | barrikaderna |
| C calorie | kalori | en kalori | kalorien | kalorier | kalorierna |
| E economy | ekonomi | en ekonomi | ekonomin | ekonomier | ekonomierna |
| F family | familj | en familj | familjen | familjer | familjerna |
| G gondola | gondol | en gondol | gondolen | gondoler | gondolerna |
| H hierarchy | hierarki | en hierarki | hierarkin | hierarkier | hierarkierna |
| I illustration | illustration | en illustration | illustrationen | illustrationer | illustrationerna |
| J jaguar | jaguar | en jaguar | jaguaren | jaguarer | jaguarerna |
| K kayak | kajak | en kajak | kajaken | kajaker | kajakerna |
| L lagoon | lagun | en lagun | lagunen | laguner | lagunerna |
| M massage | massage | en massage | massagen | massager | massagerna |

FIG. 7

MASTER A VERB GROUP 2

| English (L1) | Infinitive Infinitiv Swedish (L2) | Imperative Imperativ | Now (Nu) Present Presens | Yesterday (I går) Preteritum | have (har) Supinum | been, became (varit, blivit) Perf. Part |
|---|---|---|---|---|---|---|
| | | | *"er"* | *"te" or "de"* | *"t"* | *"d"* |
| B blow | blåsa | blås | blåser | blåste | blåst | blåsd |
| C claw | klösa | klös! | klöser | klöste | klöst | klösd |
| D dream | drömma | dröm! | drömmer | drömde | drömt | drömd om |
| F fill | fylla | fyll! | fyller | fyllde | fyllt | fylld |
| G flee | fly | flyt! | flyger | flydde | flytt | |
| H help | hjälpa | hjälp! | hjälper | hjälpte | hjälpt | hjälpd |
| K kiss | kyssa | kyss! | kysser | kysste | kysst | kyssd |
| L live | leva | lev! | lever | levde | levt | |
| O overflow | överflöda | överflöd! | överflöder | överflödde | överflött | överflödd |
| R ring | ringa | ring! | ringer | ringde | ringt | ringd |

FOREIGN LANGUAGE LEARNING TOOL AND METHOD FOR CREATING THE SAME

FIELD OF INVENTION

The present invention relates generally to the field of foreign languages and, in particular, to a novel learning tool enabling self-instruction of a foreign language and a method for creating the same.

CROSS-REFERENCE TO APPENDICES

In accordance with the method of creating a learning tool of the present invention, there is provided an exemplary arrangement of words in a first language (English) and a second language (Swedish) annexed hereto and being filed as Appendix A of the invention. The arrangement annexed hereto exemplifies a Master Group A word listing, as set forth and described hereinbelow, and the divisions of such Group A word listing based on commonalties between parts of speech, allowing users to associate like words with one another.

BACKGROUND OF THE INVENTION

Dictionaries and the like comprising translations of two different languages (a known and foreign language) are well known in the art. Conventional foreign language dictionaries typically provide a translation of a known language into a foreign language and the reciprocal, wherein a predetermined selection of words of each language is arranged alphabetically into a first column and a translation thereof into a second, adjacent column. Users of conventional dictionaries of this type simply look up a desired word in the appropriate language, either known or foreign, to determine the foreign language equivalent or definition, respectively. Conventional foreign language dictionaries of this type, while useful, typically do not enable users thereof to learn a foreign language, or even acquire general understanding of an unfamiliar language, when used without other instructional methods or materials. That is, to learn a foreign language utilizing such a tool would require the user to memorize voluminous amounts of words arranged in no particular order, other than alphabetical. Furthermore, information acquired from random memorization tends to significantly diminish over time.

In addition to conventional foreign language dictionaries, "phrasebooks" are also commonly utilized tools for understanding and speaking a foreign language, as shown, for example, in U.S. Pat. No. 6,024,571 issued to Renegar. Such books have been devised primarily for assisting travelers in a foreign country to understand and respond to common phrases. While the information contained therein tends to be organized, where phrases or terms are separated into categories relating to specific situations or topics such as greetings, dining situations, directions, etc., the information contained in phrasebooks is negligible in comparison to dictionaries. Therefore, phrasebooks and the like are insufficient to provide users with more than a minimal understanding of a foreign language.

More recent developments in the field of foreign language acquisition include, for instance, the method and system disclosed in U.S. Pat. No. 6,341,958 issued to Zilberman which teaches a method and system for acquiring a foreign language by way of switching-off subconscious translation into a native language with the aid of a plurality of drills. In particular, the drills consist of the simultaneous reading of a lesson in a foreign language, listening to the recording of the same lesson, and repeating the lesson to learn a foreign language.

While recent techniques and tools have alleviated some of the drawbacks of conventional learning tools, a need still exists for a simplified technique and learning tool that enables users to learn a foreign language by focusing on the commonalties between a first and second language, i.e., an "association method of learning," such that information acquired is more readily retained.

Accordingly, it is an object of the present invention to provide a foreign language learning tool and method of creating the same having a simplified organization of terms based on the commonalties between two predetermined languages.

It is another object of the present invention to provide a learning tool that enables a user to gain a comprehensive understanding of the vocabulary of a predetermined foreign language.

Yet another object of the present invention is to provide a method for learning a foreign language that includes the use of a learning tool organized in a manner that focuses on the commonalties between two predetermined languages and repetition of the terms therein to enhance the likelihood of retention of the foreign language.

It is a further object of the present invention to provide a learning tool that can be adapted for use by all ages and levels of understanding.

A still further object of the present invention to provide a foreign language-learning tool and method of creating the same wherein the deficiencies of conventional translation "dictionaries" are mitigated.

SUMMARY OF THE INVENTION

In accordance with the aforementioned objects and advantages, there is provided a novel foreign language learning tool and method of creating the same, both of which emphasize and focus on the commonalties between a predetermined first language and second language. The learning tool provides users with the ability to more efficiently acquire and retain the basic terminology of a foreign language and, thereafter, how to form or appropriately conjugate words by association.

In particular, there is provided a learning tool and method of creating the same comprising a plurality of words of a first language (L1), each having a corresponding translation in a second language (L2). Each L1 word and corresponding L2 translation are compared and grouped into at least first and second groups A and B, wherein group A comprises L1 words and L2 translations having one or more similar characteristics based on predetermined criteria. Group B comprises L1 words and L2 translations having minimal or no such similar characteristics.

While the learning tool may be comprised of master group A and B listings alone, it is preferred that groups A and B are divided into parts of speech, including subgroups comprising L1 and L2 nouns, verbs, adjectives, adverbs, pronouns and prepositions. Nouns, verbs or other parts of speech may first be divided into subgroups based on gender characteristics, e.g., masculine, feminine, neuter and/or common articles, if applicable.

The process of subdividing L1 and L2 words within groups A and B may be repeated as desired, such that as groups A and B are further divided, each subgroup includes L1 words and L2 translations which share more similar characteristics than the preceding group. Accordingly, the learning tool of the invention enables the user to learn a foreign language by association, focusing on the similarities between L1 and L2 as well as the similarities between words of L2 subgroups.

BRIEF DESCRIPTION OF THE DRAWINGS

For a more complete understanding of the above and other features of the invention, reference shall be made to the following detailed description of the preferred embodiments of the invention wherein:

FIGS. 4 and 5 each show a portion of a table illustrating, by way of example, an arrangement of nouns of the exemplary English and Swedish languages, wherein each noun having common characteristics is arranged into a predetermined group, such as those depicted, for facilitating an association method of learning.

FIG. 7 is a portion of a table illustrating, by way of example, an arrangement of verbs of the exemplary English and Swedish languages, wherein verbs having common characteristics are arranged into predetermined groups, such as the group shown, for facilitating an association method of learning.

DETAILED DESCRIPTION OF THE INVENTION

Broadly described, there is provided a learning tool for self-instruction of a foreign language comprising a collection of words of a predetermined first language (L1) and corresponding collection of words of a second, different language (L2). Each of the L1 words selected and compiled has a corresponding L2 translation. In accordance with the invention, each of the L1 words and corresponding L2 translations selected for utilization in connection with the learning tool are compared and thereafter organized into one of at least two groups, A and B, based on predetermined criteria.

In particular, each L1 word and its L2 translation are categorized together into either group A or B, depending on the extent to which the L1 word and corresponding L2 translation are similar. The L1 words and L2 translations that fall within group A possess one or more identifiable, similar characteristics. Whereas in group B, L1 words and L2 translations do not possess any such identifiable characteristics or merely an insufficient number thereof, i.e., group B is comprised of "dissimilar" L1 and L2 words. While the learning tool itself may simply comprise a listing of L1 words and corresponding L2 translations arranged into groups A and B as described, it has been found that acquisition of a foreign language utilizing the learning tool of the invention occurs at an increased rate when groups A and B are further divided into subgroups, as described in detail hereinbelow.

Figure 1:
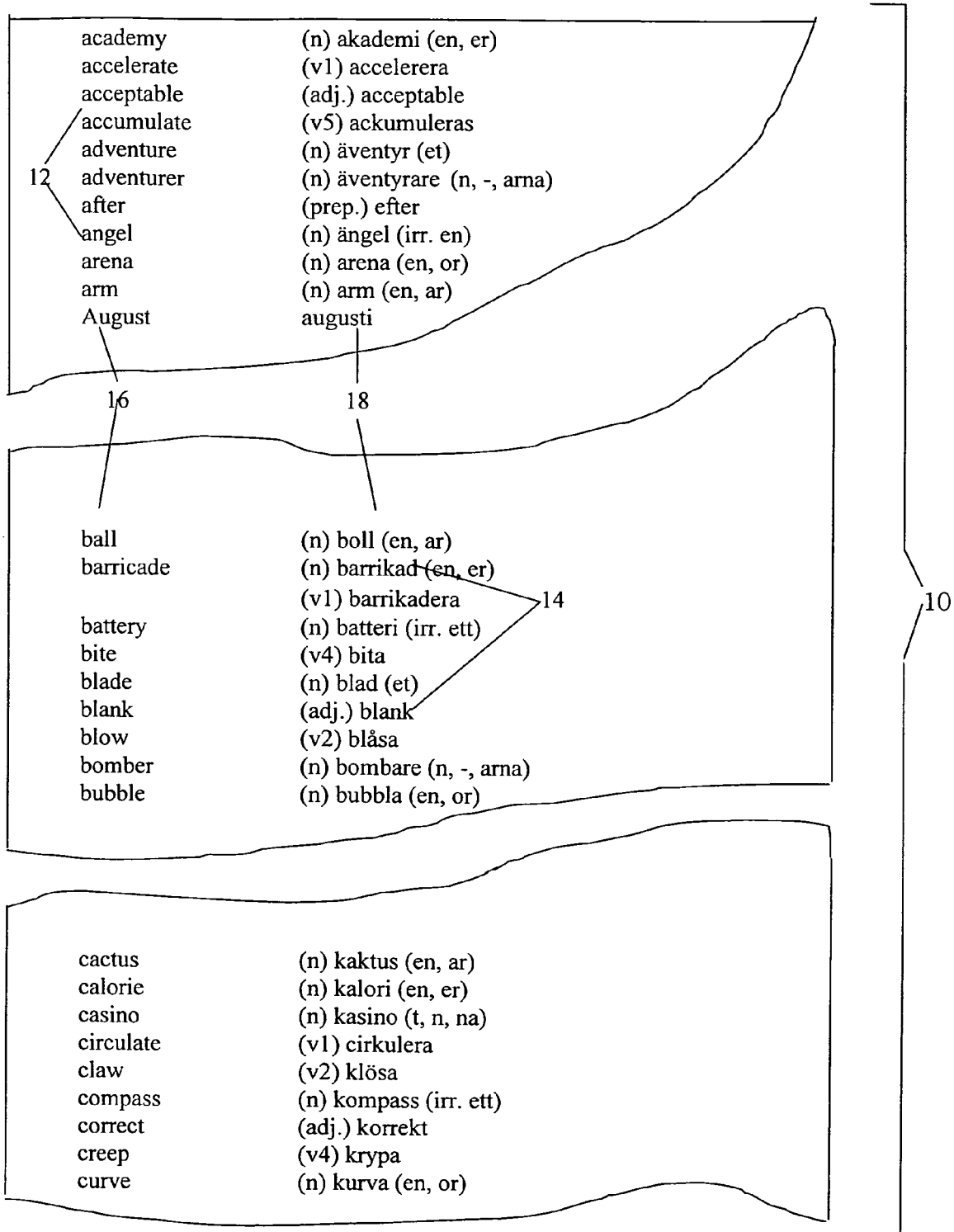
FIG. 1 is sample illustration of a fragmentary section of a group A listing in accordance with the invention utilizing the exemplary English and Swedish languages.

For a more complete understanding of the invention, reference shall now be made to the figures wherein exemplary portions of the learning tool of the present invention are depicted. For purposes of illustration only, the English and Swedish languages have been selected and shown in the accompanying figures as L1 and L2, respectively. Referring to FIG. 1, a vastly condensed portion of a group A listing is shown and generally referenced by numeral [10]. As can be seen, each L1 word [12] and corresponding L2 translation [14] (shown in columns 16 and 18 respectively) shares a readily identifiable visual or phonetic characteristic with the other. For example, each L1 word [12] and corresponding L2 translation [14] share a common character(s), generally in the same position in each word. Typically, shared similarities between a third of the characters of an L1 word [12] and L2 translation [14], either visually or phonetically (or visual or phonetic equivalents), results in an L1 word [12] and L2 translation [14] being categorized within group A [10], wherein the number of common characters generally depends on the total number of characters per word. In instances where L1 words [12] and corresponding L2 translations [14] possess only two or three characters, one common character between the L1 word [12] and L2 translation [14] is sufficient for categorization into group A [10], e.g., a L1 word [12] such as "go" and corresponding Swedish L2 [14] "ga" would fall within group A [10]. It should also be apparent that the L1 words [12] and corresponding L2 translations [14] of group A [10] share phonetic similarities resulting from common vowel or consonant position.

For a greater understanding of an exemplary group A compilation in accordance with the invention, reference should be made to Appendix A which includes a master group A listing utilizing an English L1 and Swedish L2.

Figure 2:
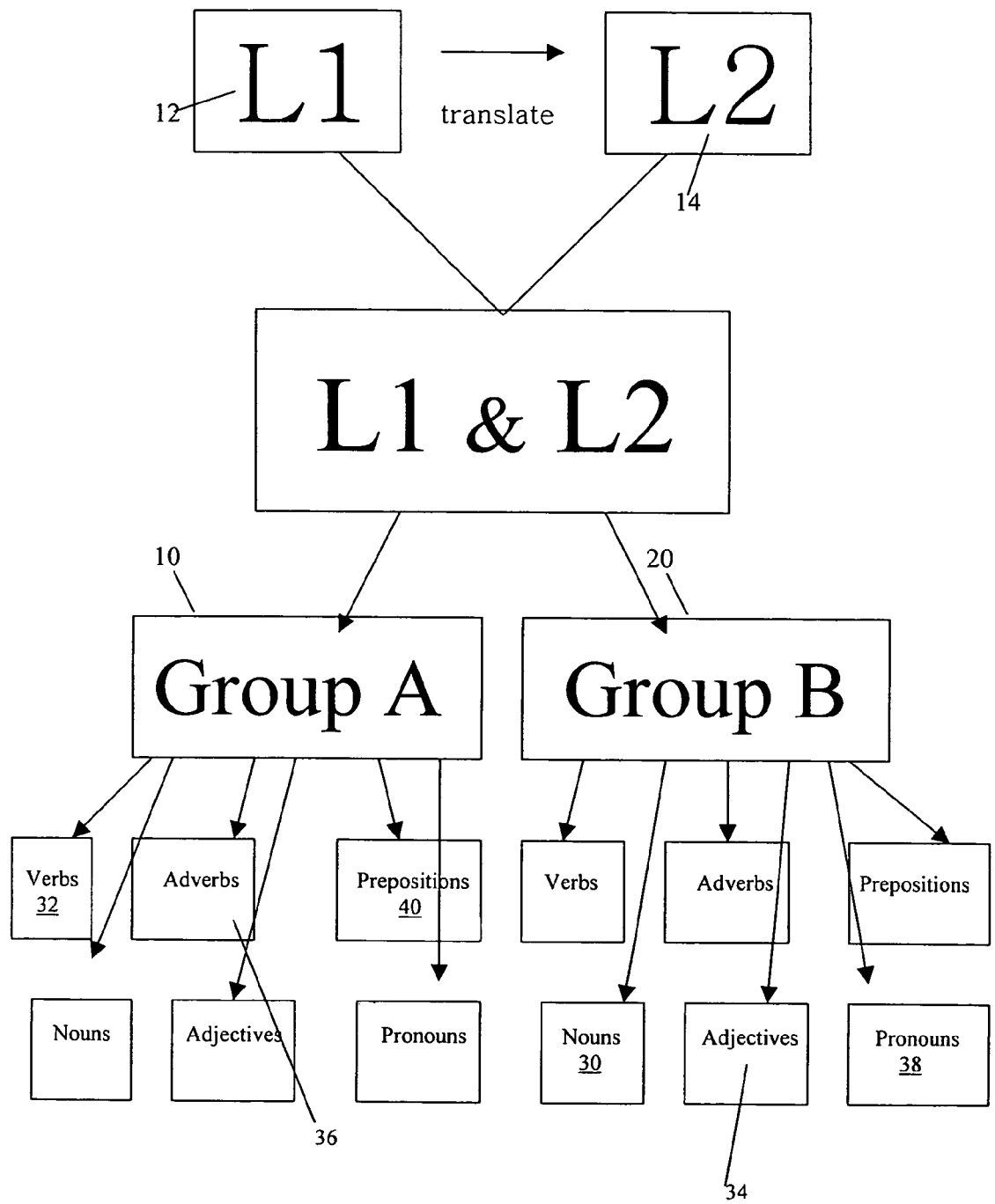
FIG. 2 is a flow diagram depicting an illustrative grouping of words of first and second languages in accordance with the method of the present invention.

In a preferred embodiment of the invention, groups A and B [10, 20] are further divided into subgroups corresponding to the major classes of words (parts of speech) including nouns [30], verbs [32], adjectives [34], adverbs [36], pronouns [38] and prepositions [40], etc, as shown, for example, in the flow diagram of FIG. 2, such that like parts of speech are commonly organized. In this manner, similar L1 words [12] and L2 translations [14] in group A [10] and "non-similar" L1 words [12] and L2 translations [14] in group B [20] are both similarly segregated. It has been found that the L2 language is more efficiently acquired when the aforementioned classes of words, in particular nouns [30] and verbs [32], are segregated or categorized based on common endings the nouns [30] or verbs [32] take in a predetermined form or tense, respectively.

More specifically and with particular reference to nouns [30] of the exemplary English L1 and Swedish L2 as set forth herein, both group A and B nouns [30a, 30b] are divided into one of five groups having the following L2 plural endings [50]: -ar, -er, -or, -are; the fifth group comprising irregular nouns, [50a, 50b, 50c, 50d; and 50e], respectively. If on the other hand, the L2 were English, nouns could be divided into five groups of plural form endings as follows: -s, -es, -ves, -ies; the fifth group of comprising irregular nouns. Grouping the nouns [30] in this manner enables the user of the learning tool to readily understand which nouns [30] share similar plural form endings [50] and thereby attain the plural forms of a plurality of nouns [30] by associating similar nouns in a predetermined group with one another.

A learning tool comprised of one or more languages having gender specific characteristics, which are common to Indo-European languages, such as Swedish, French, Spanish, Danish, etc., preferably includes an additional subgroup such that nouns [30], or other parts of speech, are categorized according to gender. That is, words belonging to either a masculine, feminine, common and/or neuter word class would be grouped accordingly with their corresponding gender article. In this manner, the ability to memorize the appropriate gender for each word is enhanced.

Figure 3:
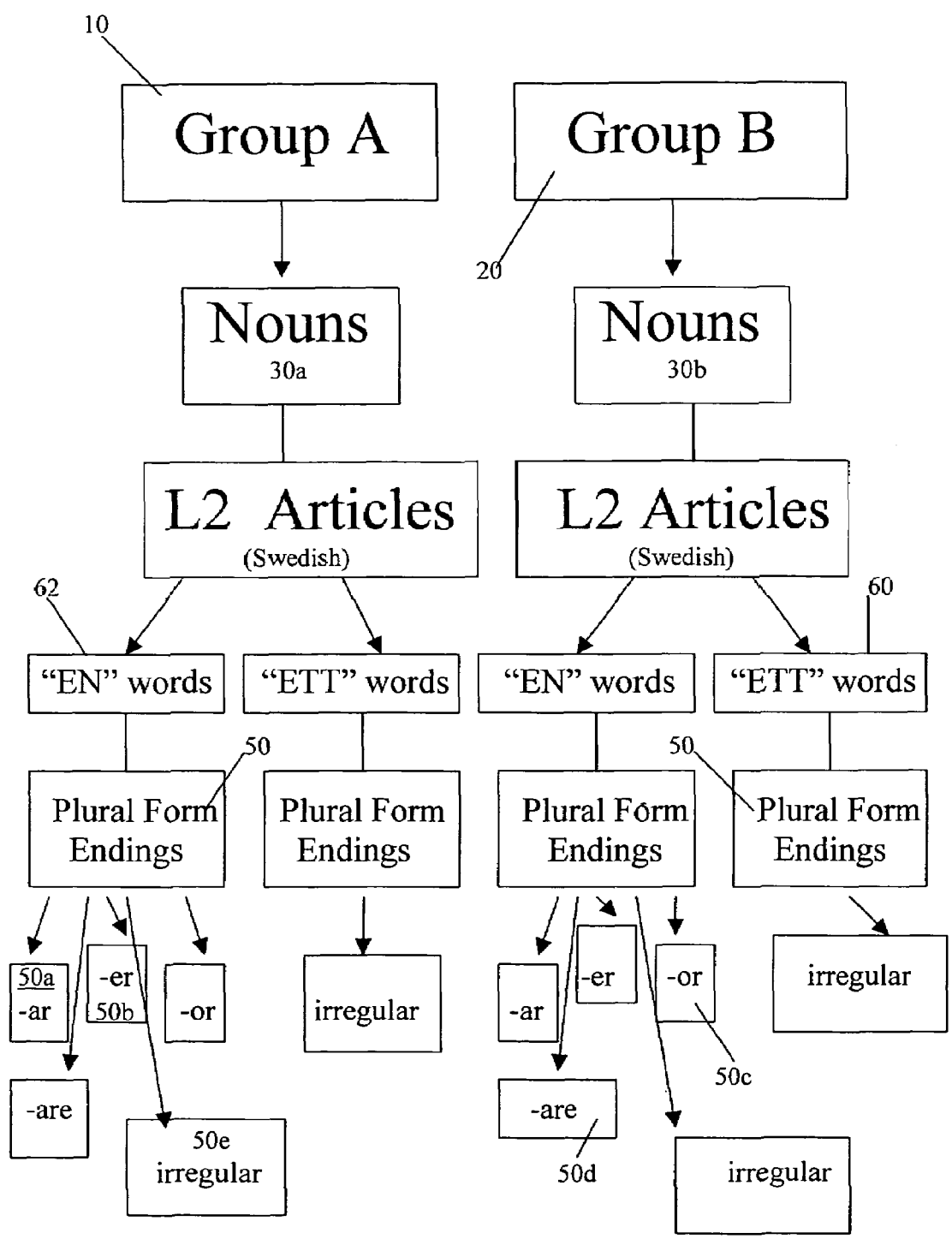
FIG. 3 is a flow diagram depicting an illustrative grouping arrangement of nouns utilizing the exemplary English and Swedish languages.

With reference to FIG. 3, utilizing the exemplary Swedish L2, it can be seen that nouns [30] are categorized into one of two gender classes, neuter [60] or common [62] wherein neuter nouns [60] posses an "ett" article and common nouns [62], the majority of Swedish nouns, possess an "en" article. Thereafter, the common and neuter nouns [62, 60] may be subdivided into one of five groups based on plural form endings [50], as set forth hereinabove. Because there is generally no standard for determining to which gender group a noun belongs, those attempting to learn a foreign language typically memorize each noun with its corresponding gender article, if applicable. It has been discovered that grouping or classifying the nouns as exemplified, for example, into "en" and "ett" noun classes, facilitates the memorization and retention of nouns and their appropriate article, as users are more likely to retain information acquired based on an association method of learning.

Referring to FIG. 4, for example, there is depicted a sampling of group A [10] illustrative nouns [30] falling within the subgroup of "en" nouns [62] having plural form -or endings [50c]. "En" nouns having -ar, -er, -are and irregular endings are arranged similarly. As can be seen in the figure, the words therein appear in columnar arrangement such that L1 words [12] and L2 translations [14] are arranged adjacent to one another. Column 70, denoted by the term "plural," is illustrative of the plural form groupings based on endings [50] as described. By way of further example, FIG. 5 shows an arrangement of group A [30a] nouns utilizing the "en" article [62], having -er endings [50b]. For a more complete understanding of the exemplary grouping arrangement of L1 and L2 nouns as detailed herein, reference may be made to the accompanying Appendix A which includes compilations of group A nouns in each of the aforementioned groups.

It should be understood that group B nouns [30b] are preferably arranged in an identical manner to the illustrative group A nouns [30a] in FIGS. 4 and 5 such that group B nouns [30b] are organized in subgroups based on the gender articles "en" and "ett" [62, 60] and further subdivided into the subgroups of L2 endings: -ar, -er, -or, -are and/or irregular plural form endings [50a, 50b, 50c, 50d and 50e].

Figure 6:
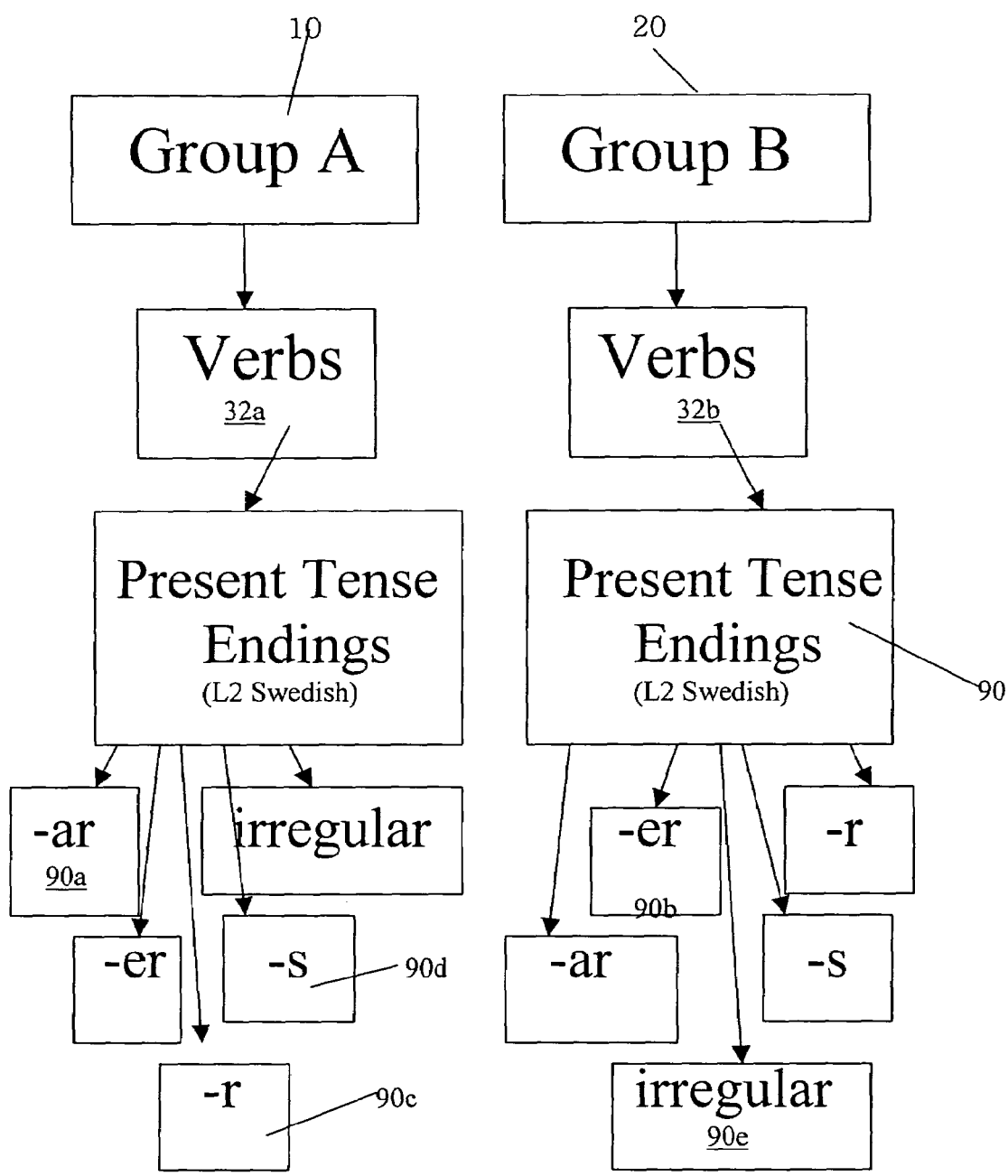
FIG. 6 is a flow diagram depicting an illustrative grouping arrangement of verbs utilizing the exemplary English and Swedish languages.

Similar to nouns [30], group A and B verbs [32a, 32b] are preferably organized into groups based upon common L2 endings [90] in a predetermined tense, which is dependent on the selected L2. With reference to the flow diagram in FIG. 6, it can be seen that L2 Swedish verbs [32] are divided into one of five groups based on verb endings in the present tense: -ar, -er, -r, -s; the fifth group comprising irregular verbs [90a, 90b, 90c, 90d; and 90e]. For example, FIG. 7 depicts an illustrative sampling of group A verbs [32a] having L2 -er endings [90b], wherein verbs [32] are organized and arranged similar to nouns [30], excluding gender articles.

While verbs [32] in this instance are grouped according to L2 present tense endings [90], L2 verbs [32] are also preferably shown in the infinitive, imperative, past and past participle tenses such that users may readily acquire an understanding of the method of conjugating a verb into a predetermined tense. As shown in FIGS. 1 and 7, this understanding is enhanced by the organization of verbs [32] based upon present tense [90] endings as shown. As indicated in the Cross-Reference to Appendices, Appendix A, filed herewith, provides further exemplary arrangements of group A verbs in having -ar, -er, -r, -s and irregular endings wherein such groups are referenced as verb groups 1-5.

In accordance with the invention and shown in FIGS. 1, 4, 5 and 7, L1 words [12] and L2 translations [14] are preferably arranged in alphabetically adjacent, vertically extending columns according to the L1 word [12] spelling. In other words, the master word listings of groups A and B [10, 20] would separately appear in column form, each group listing having at least two columns representing L1 words [12] and corresponding L2 translations [14] thereof. Advantageously, the learning tool may be organized in the form of a book or other paper-based format, permitting convenient transport thereof from one locality to another. In such a paper-based format, the learning tool is preferably organized into sections, wherein groups A and B comprise first and second sections, which are further divided into subgroups according to parts of speech, gender, articles, etc., as described herein. While a paper-based format has been described and depicted, a computerized format of the learning tool is also contemplated to be within the scope of the present invention.

Advantageously, in addition to first and second sections comprising group A and B listings, the learning tool of the present invention may include third and fourth sections (and appropriate subsections), comprising the reciprocal of first and second sections, such that L2 words appear in a first column and L1 words appear adjacently thereto. Words are therefore arranged alphabetically according to L2 spelling so that, upon hearing an L2 word, a user may easily locate the corresponding L1 translation.

The exemplary manner of grouping as described hereinabove allows users to more easily attain knowledge of a foreign language L2, as words are grouped based on commonalties, allowing users to associate like words with one another. Although L1 words and L2 translations are initially divided according to whether there exists a predetermined, shared characteristic between each L1 and L2 word (such that group B is formed of L1 words and L2 translations having an insufficient number of common characteristics), group B words are further organized into common subgroups, i.e., parts of speech, similar to group A words. Accordingly, the user is able to continuously focus on commonalties between two languages even when learning "non-similar" words of group B.

The learning tool of the present invention may also be adapted to accommodate multiple foreign languages, preferably, languages originating from a common root. In this manner, the user can attain knowledge of several languages by focusing on the commonalties therebetween. With reference to the learning tool as described herein utilizing the illustrative languages, English and Swedish, such a tool may comprise, for example, English (L1), Swedish (L2), Danish (L3), and Norwegian (L4) languages wherein the words of such languages are segregated into groups A and B as described herein. Similarly, a learning tool, such as that taught herein, could comprise languages having non-alphabetic characters, e.g., Japanese, Vietnamese and Korean, etc.

While a preferred embodiment of the learning tool has been illustrated using the exemplary L1 and L2 languages, English and Swedish, it should be understood that the nature and quantity of the subgroups is dependent upon the characteristics of the selected languages. A learning tool comprised of one or more languages having gender specific characteristics, for example, preferably includes additional subgroups such that nouns, verbs or otherwise are categorized into masculine, feminine, common and/or neuter words. While the organization of L2 words as described herein is particularly applicable to North Germanic languages such as Danish, Norwegian and Swedish, various modifications may be made to the arrangement and organization of L1 words and L2 translations without departing from the spirit and scope of the invention to provide a learning tool capable of accommodating the unique characteristics of both known and foreign languages. Accordingly, it should be understood that dependent upon the target foreign language, the content of the learning tool will vary. However, whatever the L1 and L2 languages selected, the words therein may be divided into "similar" and "non-similar" groups A and B and subdivided thereafter.

It is contemplated within the scope of the invention to provide a method for creating the above-described learning tool. In accordance therewith, a first language (L1) and second language (L2) are selected for utilization within the learning tool. A collection of L1 words [12] is generated or compiled preferably comprising frequently utilized words, which may be dependent upon the age or vocabulary of the intended speaker. The collection of words could be of any number, but it is preferred that the collection include a large quantity of words similar to the volume typical of conventional foreign language dictionaries such that the content is much greater than that of phrasebooks. Upon selecting and compiling the words to be included in the foreign language learning tool, the L1 words [12] are translated into the L2 language [14] such that each L1 word [12] has a corresponding L2 translation [14].

Upon translating L1 words [12] into a predetermined L2, each L1 word [12] and corresponding L2 translation [14] is compared for the presence of predetermined similar or common characteristics, such that L1 and L2 words [12, 14] having one or more similarities, as set forth herein, are organized into a first group A [10]. L1 and L2 words [12, 14], which are visually and phonetically dissimilar, having no predetermined shared, similar characteristics, are arranged into a second "dissimilar" group B [20]. As set forth hereinabove, group A [10] words typically share several common characters, phonetically similar characters, or equivalent characters, wherein the number of similarities depends upon the number of characters present per L1 word [12] and corresponding L2 translation [14]. Typically, shared similarities between a third of the characters of an L1 word [12] and L2 translation [14], renders a word "similar" for purposes of falling within group A [10].

This process of dividing and arranging L1 and L2 words [12, 14] may be repeated such that as the words are further divided, each subgroup includes L1 words [12] and L2 translations [14] which share more similar characteristics than the preceding group. This applies to words in both groups A and B [10, 20]. In accordance with a preferred embodiment of the invention, L1 and L2 are not only subdivided into groups A and B [10, 20], but also, each A and B group is further divided into groups based on parts of speech, wherein nouns [30], verbs [32], adverbs [36], adjectives [34], prepositions [40] and pronouns [38] in each A and B group [10, 20] are arranged separately. Thereafter, each grouping of nouns [30] and verbs [32] is divided in any suitable manner that enables the user to most efficiently acquire and understand the foreign language. In this manner, groups A and B [10, 20] may be arranged such that group B [20], as well as group A [10], is further segregated based on like characteristics. There may be as many or as few divisions, i.e., groups of words, as desired so as to enable an association method of learning wherein L1 and L2 words [12, 14] are grouped according to commonalties.

As noted hereinabove, wherein either the L1 or L2 is a language having gender specific characteristics or classes, it is preferred that groups A and B are organized accordingly. For example, with reference to the exemplary L2 depicted in the figures, parts of speech, in this instance, nouns [30], may be first organized into masculine, feminine, common and/or neuter words, (herein "en" and "ett") so that a user of the learning tool learns words sharing a common article by association.

In order to enhance the ability of a user of the learning tool of the invention to learn by association, the primary parts of speech, i.e., nouns [30] and verbs [32] of groups A and B [10, 20], are further organized or segregated based upon L2 group endings [50, 90]. That is, generally nouns [30] and verbs [32] of a language share common endings in a predetermined form or tense. With reference to the illustrative Swedish L2, nouns [30] may be divided into one of five groups having either -ar, -er, -or, -are or irregular noun endings [50] when the nouns [30] are in the plural form, as exemplified in FIGS. 3-5.

Similarly, Swedish L2 verbs [32] of groups A and B may be grouped into one of five groups depending upon each verb ending [90] in the present tense, such as -ar, -er, -r, -s and irregular present tense verb endings.

In a preferred embodiment of the method of the present invention, L1 words [12] and L2 translations [14] are arranged alphabetically in adjacent columns [16, 18] according to the L1 word spelling. That is, the L1 words [12] appear in a first column [16] as shown in FIGS. 1, 4, 5 and 7, and the corresponding L2 translation [12] in a second adjacent column [18]. The presence of additional columns is dependent upon the subdivision and number of word forms or tenses depicted therein. Advantageously, the learning tool may be organized into sections, wherein first and second sections correspond to groups A and B [10, 20], respectively, comprising "similar" and "dissimilar" L1 words [12] and L2 translations [14]. Each section may be subdivided as described into parts of speech, thereafter gender articles, if applicable, and subgroups based on word endings, common to nouns and verbs.

In addition, like foreign language dictionaries, the learning tool of the invention may include third and fourth sections corresponding to the reciprocal of first and second sections. That is, with reference to the English L1 and Swedish L2 described herein, third and fourth sections would correspond to groups A and B arranged alphabetically according to the spelling of L2 words. The reciprocal groups A and B may be subdivided into parts of speech and, if applicable, gender characteristics.

Accordingly, the method of creating the learning tool of the invention is based on an association method of organization, such that similar and dissimilar L1 and L2 words [12, 14] are organized together into at least groups A and B [10, 20] and further subdivided such that words sharing like characteristics are arranged together. This method provides for a learning tool and method of using the same enabling the user to learn a foreign language by association, whereby knowledge of a foreign language is acquired more efficiently and more readily retained.

In use, the user may first learn an L2 by reviewing the text of group A [10] and its subdivisions or subgroups. Thereafter, the user may repeat the process with group B [20]. Because group A and group B both include subgroups of words sharing similar characteristics, forms and tenses, the user associates one word of a subgroup with others to acquire a broad based understanding of a foreign language.

While the learning tool and methods of creating and using the same have being illustrated herein with reference to the English and Swedish languages as L1 and L2, it should be realized that any language might be adapted to the learning tool and methods of the invention. Accordingly, the scope of the present invention should be defined by the appended claims.

What is claimed is:

1. Method of creating a learning tool enabling self-instruction of a foreign language comprising the steps of:
   pre-selecting a first and a second language, said second language being different from said first language;
   compiling a predetermined collection of words in said first language and said second language, each said word of said first language corresponding to a translation thereof in said second language;
   comparing each said word in said first language to each said corresponding translation in said second language; and
   assigning and organizing each said word in said first language and corresponding translation in said second language into one of first and second groups, A and B, wherein said first group A comprises words in said first and second languages which have a predetermined quantity of common characters shared between said word of said first language and said translation in said second language.

2. The method as set forth in claim 1, wherein said second group B comprises words having a quantity of said common characters shared between said word of said first language and said translation in said second language that is less than said predetermined quantity.

3. The method as set forth in claim 1 further comprising the step of arranging each said word of said first language and corresponding translation in said second language of groups A and B into adjacent columns.

4. The method as set forth in claim 1 further comprising the step of arranging said groups A and B into subgroups according to parts of speech.

5. The method as set forth in claim 4, wherein said parts of speech comprise noun and verb subgroups.

6. The method as set forth in claim 5 further comprising the step of arranging said noun subgroups according to gender articles.

7. The method as set forth in claim 5 further comprising the step of arranging said noun subgroups according to plural form endings of said second language.

8. The method as set forth in claim 5 further comprising the step of arranging said verb subgroups according to present tense endings of said verbs of said second language.

9. The method as set forth in claim 1, wherein each said word of said first language and said second language translation thereof share at least one common character.

10. The method as set forth in claim 1, wherein said parts of speech comprise adjective, adverb, preposition and pronoun subgroups.

11. The method as set forth in claim 1, wherein said common characters comprises identical characters, phonetically similar characters, and equivalent characters.

12. The method as set forth in claim 1, wherein said predetermined quantity is equal to one third of the characters in a word in said first language as compared with said translation in said second language.

* * * * *